(12) United States Patent
Gao et al.

(10) Patent No.: US 8,849,248 B2
(45) Date of Patent: Sep. 30, 2014

(54) METHOD AND SYSTEM FOR ACCESSING COMPLETION OF CALL TO BUSY SUBSCRIBER SERVICE BASED ON IDENTITY

(75) Inventors: Yang Gao, Shenzhen (CN); Shaolian Zhang, Shenzhen (CN); Mingjiang Zou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 38 days.

(21) Appl. No.: 13/258,319

(22) PCT Filed: Jun. 12, 2010

(86) PCT No.: PCT/CN2010/073909
§ 371 (c)(1),
(2), (4) Date: Jul. 16, 2012

(87) PCT Pub. No.: WO2011/094983
PCT Pub. Date: Aug. 11, 2011

(65) Prior Publication Data
US 2012/0282897 A1    Nov. 8, 2012

(30) Foreign Application Priority Data

Feb. 2, 2010   (CN) .......................... 2010 1 0105056

(51) Int. Cl.
*H04W 12/00*   (2009.01)
*H04L 29/06*   (2006.01)
(Continued)

(52) U.S. Cl.
CPC ............. *H04W 4/16* (2013.01); *H04L 63/1466* (2013.01); *H04W 12/06* (2013.01); *H04L 63/08* (2013.01); *H04M 3/48* (2013.01); *H04M 3/42059* (2013.01); *H04W 12/12* (2013.01)
USPC ........................ 455/411; 455/410; 379/210.01

(58) Field of Classification Search
USPC ............................... 455/411, 410; 379/210.01
See application file for complete search history.

(56) References Cited

U.S. PATENT DOCUMENTS 7,149,299 B2 * 12/2006 Triano et al. ............. 379/210.01
(Continued)

FOREIGN PATENT DOCUMENTS

CN        1770685 A    5/2006
(Continued)

OTHER PUBLICATIONS

International Search Report in international application No. PCT/CN2010/073909, mailed on Nov. 18, 2010.
(Continued)

*Primary Examiner* — Steven Kelly
(74) *Attorney, Agent, or Firm* — Oppedahl Patent Law Firm LLC

(57) ABSTRACT

A method for accessing a CCBS service based on an identity comprises: when receiving a call invite and determining that the call invite includes a call completion indicator, a Terminating Application Server (T_AS) authenticates the identity of a caller initiating the call invite, allows the access of the caller when the identity authentication is passed; and rejects the access of the caller when the identity authentication is failed. A system for accessing a CCBS service based on an identity comprises: a receiving unit, configured to receive a call invite and to trigger the authenticating unit when determining that the call invite includes a call completion indicator; an authenticating unit, configured to authenticate the identity of a caller in the call invite, to trigger the accessing unit when the authentication is passed and to trigger the rejecting unit when the authentication is failed; an accessing unit, configured to access the call from the caller; and a rejecting unit, configured to reject access of the call from the caller. A call access device is provided. The disclosure fully ensures the call order of accessing a calling subscriber to a called subscriber, embodies the call access justification and prevents the preferential call access right of a malicious subscriber.

6 Claims, 8 Drawing Sheets

(51) Int. Cl.
    *H04W 12/06* (2009.01)
    *H04W 4/16* (2009.01)
    *H04M 3/48* (2006.01)
    *H04M 3/42* (2006.01)
    *H04W 12/12* (2009.01)

(56) References Cited

U.S. PATENT DOCUMENTS

| | | | |
|---|---|---|---|
| 8,170,188 B2* | 5/2012 | Bozionek et al. | 379/114.01 |
| 8,359,015 B2* | 1/2013 | Swaminathan et al. | 455/414.1 |
| 2004/0067781 A1* | 4/2004 | Grech et al. | 455/567 |
| 2008/0089504 A1* | 4/2008 | Veenstra | 379/207.02 |
| 2009/0110172 A1* | 4/2009 | Unmehopa et al. | 379/210.01 |
| 2009/0147929 A1 | 6/2009 | Zhao | |
| 2011/0045799 A1* | 2/2011 | Cofta | 455/411 |

FOREIGN PATENT DOCUMENTS

| | | |
|---|---|---|
| CN | 101035166 A | 9/2007 |
| CN | 101047741 A | 10/2007 |
| CN | 101217598 A | 7/2008 |
| CN | 101309329 A | 11/2008 |
| EP | 2053873 A1 | 4/2009 |

OTHER PUBLICATIONS

English Translation of the Written Opinion of the International Search Authority in international application No. PCT/CN2010/073909, mailed on Nov. 18, 2010.

Supplementary European Search Report in European application No. 10845066.9, mailed on Jun. 18, 2013.

Call Completion for Session Initiation Protocol (SIP) Oct. 26, 2009.

Extensions to the Session Initiation Protocol (SIP) for the support of the Call Completion Services for the European Telecommunications Standards Institute Feb. 1, 2007.

RFC 3261: SIP: Session Initiation Protocol Jun. 1, 2002.

* cited by examiner

US 8,849,248 B2

METHOD AND SYSTEM FOR ACCESSING COMPLETION OF CALL TO BUSY SUBSCRIBER SERVICE BASED ON IDENTITY

TECHNICAL FIELD

The disclosure relates to a processing technology for a Completion of Call to Busy Subscriber (CCBS) service, particularly to a method and system for accessing a CCBS service based on an identity for a terminating Application Server (AS) in the CCBS service.

BACKGROUND

FIG. 1 is a flowchart of the existing CCBS service, as shown in FIG. 1, the flow of the existing CCBS service comprises:

Step 1: a calling subscriber A calls a called subscriber B, and the called subscriber B rejects a call invite from the calling subscriber A for subscriber busy;

Step 2: an Originating Application Server (O_AS) sends a subscribe message (SUBSCRIBE) to the T_AS to subscribe the idle state of the called subscriber;

Step 3: after receiving the SUBSCRIBE from the O_AS, the Terminating Application Server (T_AS) returns a 202OK message to the O_AS to acknowledge receiving the SUBSCRIBE;

after step 3, the T_AS begins to perform a busy state supervision on the called subscriber B (a busy state supervision begins), and when the current state of the called subscriber B is detected to become available (user B becomes available), Step 4 is executed;

Step 4: when the called subscriber is idle, the T_AS transverses the list of the O_AS subscribing the idle state of the subscriber and sends a notification message (NOTIFY) to the first O_AS subscribing the idle state currently;

Step 5: after receiving the NOTIFY, the O_AS returns a 200OK acknowledgment message to the T_AS; and Step 6~Step 10: the O_AS notifies the calling subscriber A of initiating a recall invite (INVITE) in an REFER mode, and adds call completion indicator (CC call indicator) information into the call invite of the calling subscriber A; or the O_AS sends a 3rd Party Call Control (3PCC) flow, sends a call invite to the called subscriber B and adds call completion indicator information in the call invite.

After receiving the call invite, the T_AS judges whether the call invite includes the call completion indicator information, if the call invite includes the call completion indicator information, the T_AS forwards the call invite to the called subscriber B; and, if the call invite does not include the call completion indicator information, the T_AS rejects the current call invite by a 486 (Busy Here) failure response.

If the T_AS allows this call, the subsequent processing flow will be continued to complete this call.

FIG. 2 is a flowchart illustrating performing a malicious call based on FIG. 1, as shown in FIG. 2, performing a malicious call by a malicious call subscriber is specifically as follows:

the processing way in step 1 to step 5 here are completely as same as that in step 1 to step 5 in FIG. 1, thereby needing no further description for details;

Step 6: a malicious subscriber or an other application server sends a call invite to the T_AS, wherein the malicious subscriber inserts call completion indicator information in the call invite initiated by the malicious subscriber per se; the T_AS will process the call of the malicious subscriber according to the circumstance of the calling subscriber A in step 1 to step 5, i.e., taking the call invite of the current malicious subscriber as a subscriber of the CCBS service;

Step 7: the T_AS forwards the call invite of the malicious subscriber to the called subscriber B to perform a call access;

in this way, the malicious subscriber is accessed to the called subscriber B prior to a normal subscriber A; and the processing flow in step 8 to step 12 corresponds to that in FIG. 1, thereby needing no further description for details.

It can be seen from FIG. 2 that, if a malicious subscriber adds call completion indicator information into a call invite by itself, the originating network does not filter the message, such that the call invite of the malicious subscriber including call completion indicator information will be sent to the T_AS to set up a call. In this way, a calling subscriber firstly initiating a subscription fails to complete the call at first, but a calling subscriber initiating subscription later completes the call. So, the malicious subscriber equivalently jumps the queue. Obviously, this is not favourable for calling justification and may even affect the normal calling of normal subscribers.

SUMMARY

In view of the above-mentioned problem, the main target of the disclosure is to provide a method and system for accessing a Completion of Call to Busy Subscriber (CCBS) service based on an identity, which can reject the call invite of a malicious subscriber including call completion indicator information.

In order to achieve the target, the technical solution of the disclosure is implemented as follows.

A method for accessing a CCBS service based on an identity comprises:

when receiving a call invite and determining that the call invite includes a call completion indicator, a Terminating Application Server (T_AS) authenticates the identity of a caller initiating the call invite, allows the access of the caller when the identity authentication is passed; rejects the access of the caller when the identity authentication is failed.

Preferably, the caller may comprise a calling subscriber or a calling user equipment; and a callee may comprise a called subscriber or a called user equipment.

Preferably, the rejecting the access of the caller may comprise: rejecting the access of the caller by sending a reject message to the caller, wherein the reject message is a 486 message.

Preferably, the method may further comprise: the T_AS, when detecting that the callee is idle, sends a notification message indicating that the callee is idle to the caller, and records identifier information of the caller; and the authenticating the identity of the caller initiating the call invite may comprise: the T_AS extracts the identifier information of the caller from the call invite, and compares the identifier information with identifier information of the caller recorded in the T_AS, wherein the identity authentication is passed when the identifier information of the caller from the call invite is identical to the identifier information of the caller recorded in the T_AS, and the identity authentication is failed when the identifier information of the caller from the call invite is not identical to the identifier information of the caller recorded in the T_AS.

Preferably, the T_AS may authenticate the identity of the caller based on a shared key.

Preferably, the T_AS may authenticate the identity of the caller based on the shared key specifically by: the T_AS determining whether a recall invite of the caller forwarded by the O_AS includes shared key information, and sending a reject message to the O_AS when the shared key information is not included, wherein the reject message includes a challenge value generated based on the shared key; the caller resending a call invite, which includes the shared key information, to the T_AS; and the T_AS authenticating the shared key information, wherein the identity of the caller becomes legal when the authentication is passed and the identity of the caller becomes illegal when the authentication is failed.

Preferably, the T_AS may authenticate the identity of the caller based on the shared key specifically by: the T_AS, when detecting that the callee is idle, sending a notification message to the O_AS, wherein the notification message includes a challenge value generated based on the shared key; the caller sending a recall invite including the shared key information to the T_AS; and the T_AS authenticating the shared key information in the recall invite, wherein the identity of the caller becomes legal when the authentication is passed and the identity of the caller becomes illegal when the authentication is failed.

Preferably, the method may further comprise: the T_AS allocates an identifier for a caller rejected for subscriber busy and notifies the caller or the O_AS; the caller sends a recall invite, which includes the identifier information, to the T_AS, and; and the T_AS authenticates the identifier information in the recall invite, wherein the identity of the caller becomes legal when the authentication is passed and the identity of the caller becomes illegal when the authentication is failed.

A system for accessing a CCBS service based on an identity comprises a receiving unit, an authenticating unit, an accessing unit and a rejecting unit; wherein the receiving unit is configured to receive a call invite and to trigger the authenticating unit when determining that the call invite includes a call completion indicator;

the authenticating unit is configured to authenticate the identity of a caller in the call invite, to trigger the accessing unit when the authentication is passed and to trigger the rejecting unit when the authentication is failed;

the accessing unit is configured to access the call from the caller; and the rejecting unit is configured to reject access of the call from the caller.

Preferably, the system may further comprise a detecting unit and a sending and recording unit; wherein the detecting unit is configured to trigger the sending and recording unit when detecting that the callee is idle; the sending and recording unit is configured to send a notification message indicating that the callee is idle to the caller and to record identifier information of the caller; and the authenticating unit extracts the identifier information of the caller from the call invite forwarded by the O_AS, and compares the identifier information with identifier information of the caller recorded in the T_AS, wherein the identity authentication is passed when the identifier information of the caller from the call invite is identical to the identifier information of the caller recorded in the T_AS, and the identity authentication is failed when the identifier information of the caller from the call invite is not identical to the identifier information of the caller recorded in the T_AS.

Preferably, the authenticating unit may further authenticate the identity of the caller based on a shared key.

Preferably, the authenticating unit may further comprise a determining sub-unit, a sending sub-unit, a re-sending sub-unit and an authenticating sub-unit; wherein the determining sub-unit is configured to determine whether the recall invite of the caller forwarded by the O_AS includes shared key information, to trigger the sending sub-unit when the shared key information is not included, and to trigger the authenticating sub-unit when the shared key information is included; the sending sub-unit is configured to send a reject message including a challenge value generated based on the shared key to the O_AS; the resending sub-unit is configured to send a call invite including the shared key information to the T_AS; and the authenticating sub-unit is configured to authenticate the shared key information, wherein the identity of the caller becomes legal when the authentication is passed and the identity of the caller becomes illegal when the authentication is failed.

Preferably, the authenticating unit may further comprise a detecting sub-unit, a first sending sub-unit, a second sending sub-unit and an authenticating sub-unit; wherein the detecting sub-unit is configured to trigger the sending sub-unit when detecting that the callee is idle; the first sending sub-unit is configured to send a notification message including a challenge value generated based on the shared key to the O_AS; the second sending sub-unit is configured to send a recall invite including the shared key information to the T_AS; and the authenticating sub-unit is configured to authenticate the shared key information in the recall invite, wherein the identity of the caller becomes legal when the authentication is passed and the identity of the caller becomes illegal when the authentication is failed.

Preferably, the system may further comprise an allocating unit, a notifying unit and a sending unit; wherein the allocating unit is configured to allocate an identifier for the caller rejected for subscriber busy; the notifying unit is configured to notify the caller or the O-AS of the identifier; the sending unit is configured to send a recall invite including the identifier information to the T_AS; and the authenticating unit authenticates the identifier information in the recall invite, wherein the identity of the caller becomes legal when the authentication is passed and the identity of the caller becomes illegal when the authentication is failed.

In the disclosure, a mechanism for authenticating the identity of a calling subscriber is set in the T_AS to authenticate the identity of a subscriber included in the recall invite initiated by the calling subscriber, and, only the calling subscriber passing the identity authentication can be allowed to access a call; otherwise, the calling subscriber is rejected to access a call. The disclosure fully ensures the call order of accessing a calling subscriber to a called subscriber, embodies the call access justification and prevents the preferential call access right of a malicious subscriber.

DETAILED DESCRIPTION

The basic idea of the disclosure is that: a mechanism for authenticating an identity of a calling subscriber is set in a Terminating Application Server (T_AS) to authenticate the identity of a subscriber included in a recall invite initiated by the calling subscriber, and, only the calling subscriber, when the identity authentication is passed, can be allowed to access a call; otherwise, the calling subscriber is rejected to access a call. The disclosure fully ensures the call order of accessing a calling subscriber to a called subscriber, embodies the call access justification and prevents the preferential call access right of a malicious subscriber.

To make the aim, technical solution and advantages of the disclosure more clear and understood, the disclosure will be further described in detail with reference to embodiments and drawings.

Figure 1:
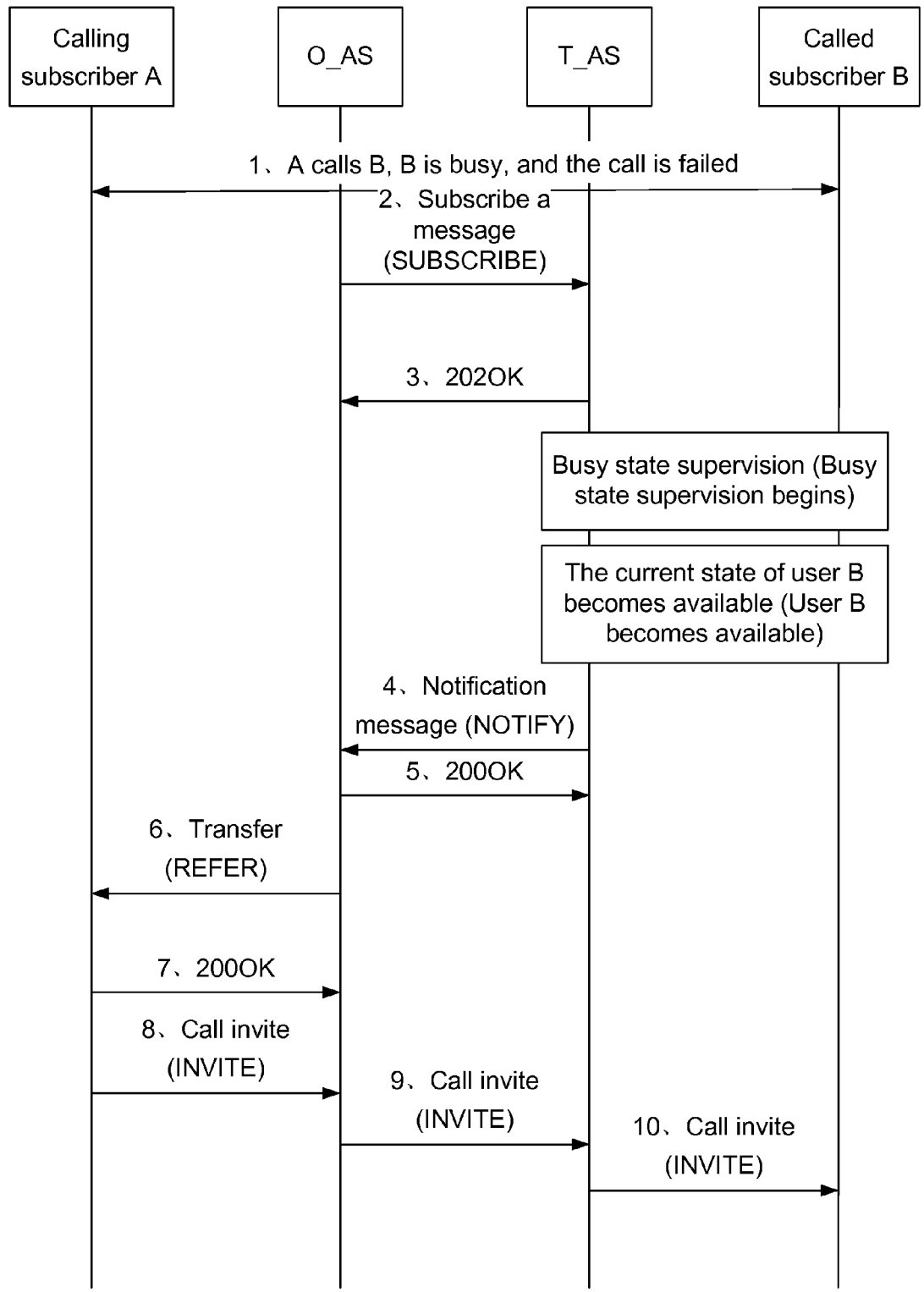
FIG. 1 is a flowchart of the existing Completion of Call to Busy Subscriber (CCBS) service.
Figure 2:
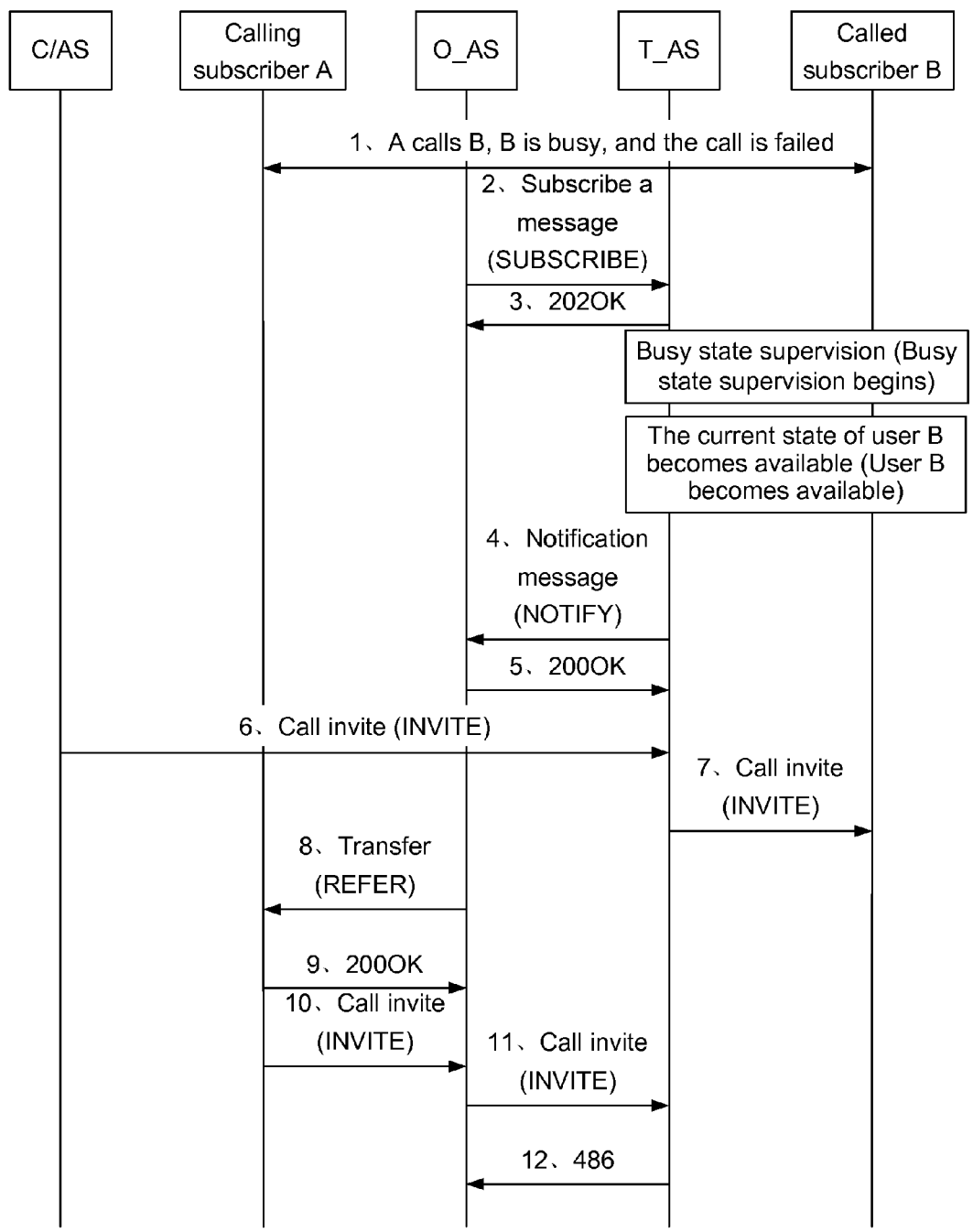
FIG. 2 is a flowchart illustrating performing a malicious call based on FIG. 1.
Figure 3:
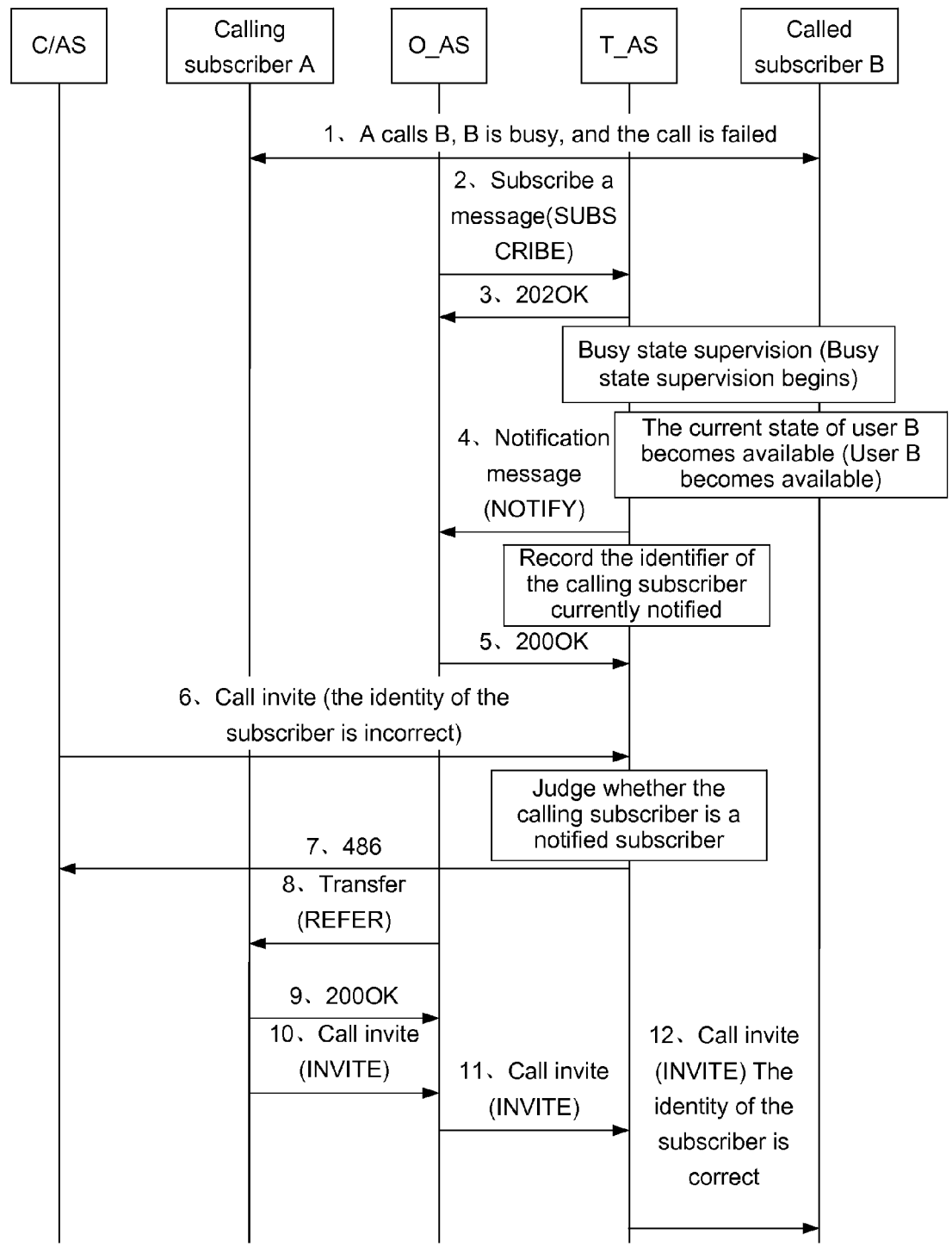
FIG. 3 is a flowchart illustrating a first embodiment of a method for accessing a CCBS service based on an identity in the disclosure.

FIG. 3 is a flowchart illustrating a first embodiment of a method for accessing a CCBS service based on an identity in the disclosure, as shown in FIG. 3, the method for accessing the CCBS service based on the identity in the embodiment comprises the following steps:

Step 1: a calling subscriber A calls a called subscriber B, and the called subscriber B is busy and rejects the call;

Step 2: when the calling subscriber A has a CCBS service, the O_AS subscribes to an idle state of the called subscriber B from the T_AS;

Step 3: the T_AS returns a 202OK message for the subscribe message and begins to detect the busy state of the called subscriber B (a busy state detecting begins);

Step 4: when detecting that the called subscriber B is idle, the T_AS sends a notification message to the O_AS and records the identifier information of the calling subscriber notified this time;

Step 5: the O_AS returns a 200OK message for the notification message;

Step 6: at the moment, a subscriber C or another AS representative the subscriber C sends a call invite to the T_AS of the called subscriber B, wherein the call invite includes a call completion indicator (CC call indicator);

Step 7: the T_AS matches the recorded identifier of the calling subscriber A currently notified with the identifier of the subscriber C, and rejects the call invite and sends a 486 reject message to the subscriber C if the matching is not successful;

Step 8: the O_AS initiates a recall flow (Recall), taking the recall flow in an REFER mode as an example, the O_AS sends an REFER message to the calling subscriber A;

Step 9: the calling subscriber A returns a 200OK message for the REFER message;

Step 10: the calling subscriber A sends a call invite to the O_AS;

Step 11: the O_AS forwards the call invite to the T_AS; and

Step 12: the T_AS forwards the call invite to the called subscriber B. The T_AS matches the identifier of the calling subscriber in the received call invite, and forwards the call invite to the called subscriber B and accesses the calling subscriber A to the called subscriber B if it is completely matched.

In the embodiment, when sending a notification message to the O_AS in step 4, the T_AS will store the identifier of the calling subscriber A to judge whether the identifier information of the calling subscriber from the call invite is matched with the identifier information of the notified calling subscriber stored in the T_AS per se after receiving the recall invite for the called subscriber B, rejects the call invite if they are not matched, or forwards the current call invite to the called subscriber B when they are matched. By the mechanism, an illegal call invite of a malicious subscriber can be avoided.

In the disclosure, a caller comprises a calling subscriber or a calling User Equipment (UE); and a callee comprises a called subscriber or a called user equipment.

Figure 4:
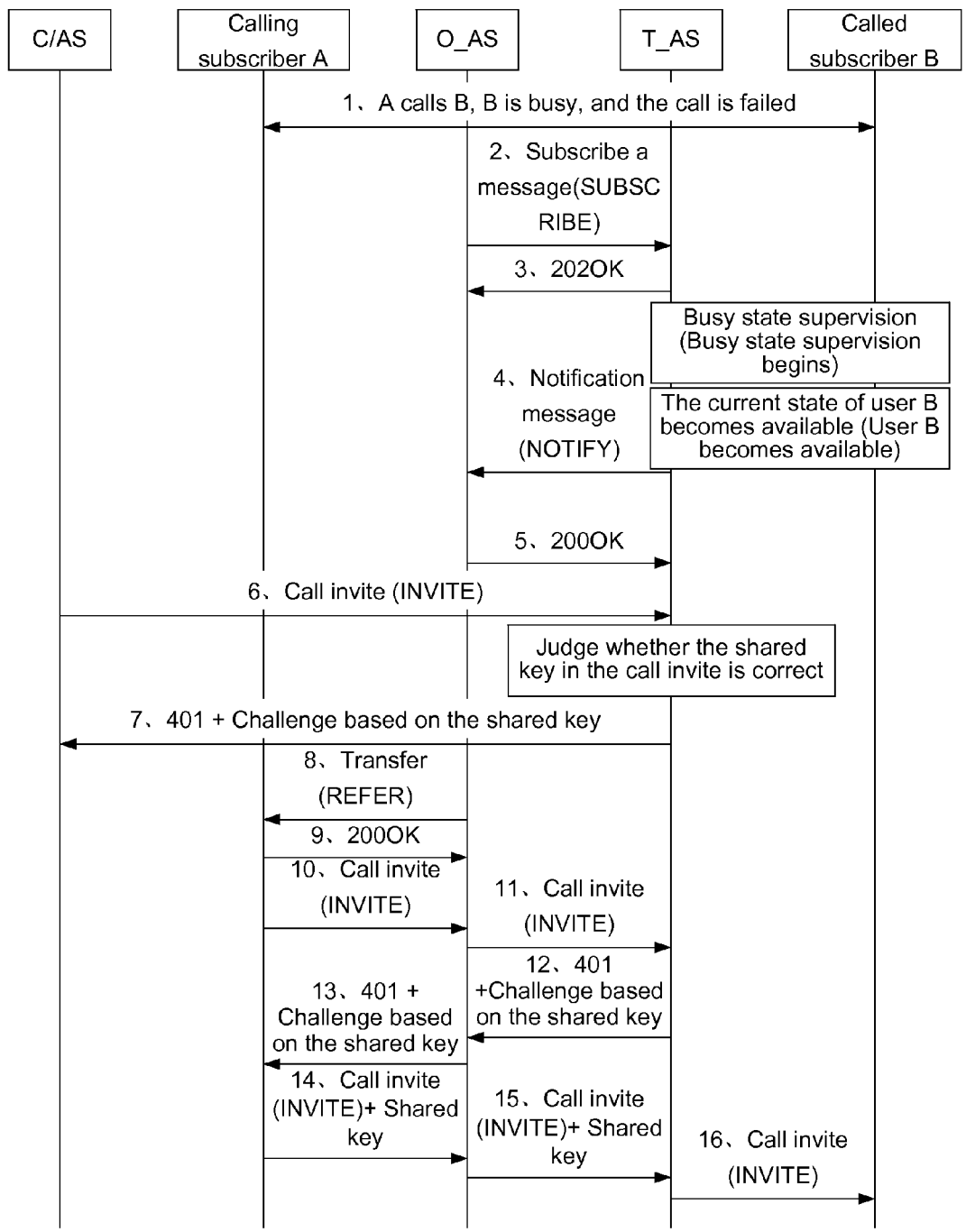
FIG. 4 is a flowchart illustrating a second embodiment of a method for accessing a CCBS service based on an identity in the disclosure.

FIG. 4 is a flowchart illustrating a second embodiment of a method for accessing a CCBS service based on an identity in the disclosure, as shown in FIG. 4, the method for accessing the CCBS service based on the identity in the embodiment comprises the following steps.

Step 1 to step 5 here are completely as same as that in FIG. 3, thereby needing no further description of the processing details;

Step 6: a subscriber C or another AS representative the subscriber C sends a call invite to the T_AS of the called subscriber B, wherein the call invite includes a call completion indicator (CC call indicator);

Step 7: the T_AS receives a recall invite, and judges whether the current call invite includes a shared key, and, if the authentication is failed (a shared key is not included) the T_AS uses a 401 reject message, including a challenge value generated based on the shared key, to reject the call invite; for a malicious subscriber C or an AS forwarding a call invite of the malicious subscriber C, if there is no shared key in the call invite, it is impossible to falsify authentication information and send a call invite which can pass the authentication again;

Step 8: the O_AS including the challenge value generated based on the shared key resends a recall flow (Recall), and taking the recall flow in an REFER mode as an example, the O_AS sends the REFER message to the calling subscriber A;

Step 9: the calling subscriber A returns a 200OK message for the REFER message;

Step 10: a calling side (calling subscriber A) initiates a call invite, wherein the call invite does not include the authentication information of the shared key at this moment;

Step 11: the O_AS forwards the call invite to the T_AS, since the first recall invite of the calling subscriber A does not include the authentication information of the shared key, the authentication can be failed;

Step 12: the T_AS uses a 401 reject message, including a challenge value generated based on a shared key, to reject the call invite;

Step 13: the O_AS forwards the 401 reject message to the calling subscriber A, wherein the reject message includes the challenge value generated based on the shared key;

Step 14: the calling subscriber A resends a call invite including the authentication information of the shared key;

Step 15: the O_AS forwards the call invite of the calling subscriber A to the T_AS; and Step 16: the T_AS forwards the call invite to the called subscriber B. The T_AS authenticates the shared key in the received call invite, and, if the authentication is passed, the T_AS forwards the call invite to the called subscriber B to make the calling subscriber A access to the called subscriber B.

In the embodiment, in step 14, the call invite initiated by the calling subscriber A may not include key information, and in step 15, after receiving the call invite, the O_AS generates a corresponding key and inserts it into the call invite.

It should be understood by those skilled in the art that, it is easy to set key authentication in a corresponding access device.

Figure 5:
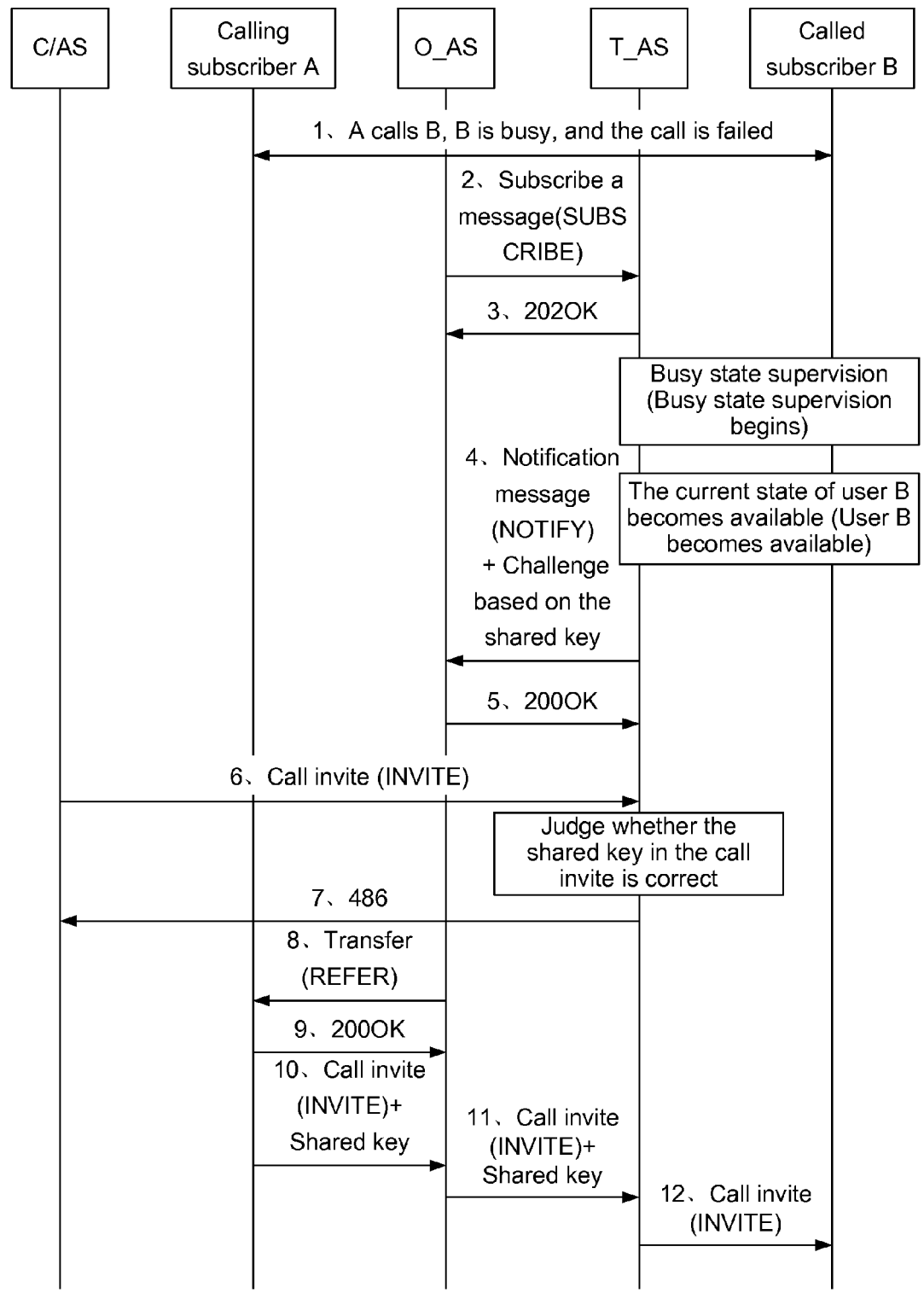
FIG. 5 is a flowchart illustrating a third embodiment of a method for accessing a CCBS service based on an identity in the disclosure.

FIG. 5 is a flowchart illustrating a third embodiment of a method for accessing a CCBS service based on an identity in the disclosure, as shown in FIG. 5, the method for accessing the CCBS service based on the identity in the embodiment comprises the following steps.

Step 1 to step 3 here are completely as same as that in FIG. 3, thereby needing no further description of the processing details;

Step 4: when detecting that the called subscriber B is idle, the T_AS sends a notification message to the O_AS, wherein the notification message includes a challenge value generated based on the shared key;

Step 5: the O_AS sends a 200OK acknowledgement message to the T_AS;

Step 6: a subscriber C or another AS representative the subscriber C sends a call invite to the T_AS of the called subscriber B, wherein the call invite includes a call completion indicator (CC call indicator);

Step 7: the T_AS receives a recall invite, and judges whether the current call invite includes a shared key, and, if the authentication is failed (the shared key is not included), the T_AS directly sends a 486 message to the subscriber C to reject the call invite;

Step 8: the O_AS initiates a recall flow (Recall), taking the recall flow in an REFER mode as an example, the O_AS sends an REFER message to the calling subscriber A;

Step 9: the calling subscriber A sends a 200OK acknowledgement message to the O_AS;

Step 10: the calling subscriber A initiates a call invite, wherein the call invite includes the authentication information of the shared key;

Step 11: the O_AS forwards the call invite of the calling subscriber A to the T_AS; and Step 12: the T_AS forwards the call invite to the called subscriber B. The T_AS authenticates the shared key in the received call invite, and if the authentication is passed, the T_AS forwards the call invite to the called subscriber B to make the calling subscriber A access to the called subscriber B.

In the embodiment, in step 10, the call invite initiated by the calling subscriber A may not include key information, and in step 11, after receiving the call invite, the O_AS generates a corresponding key and inserts it into the call invite.

Figure 6:
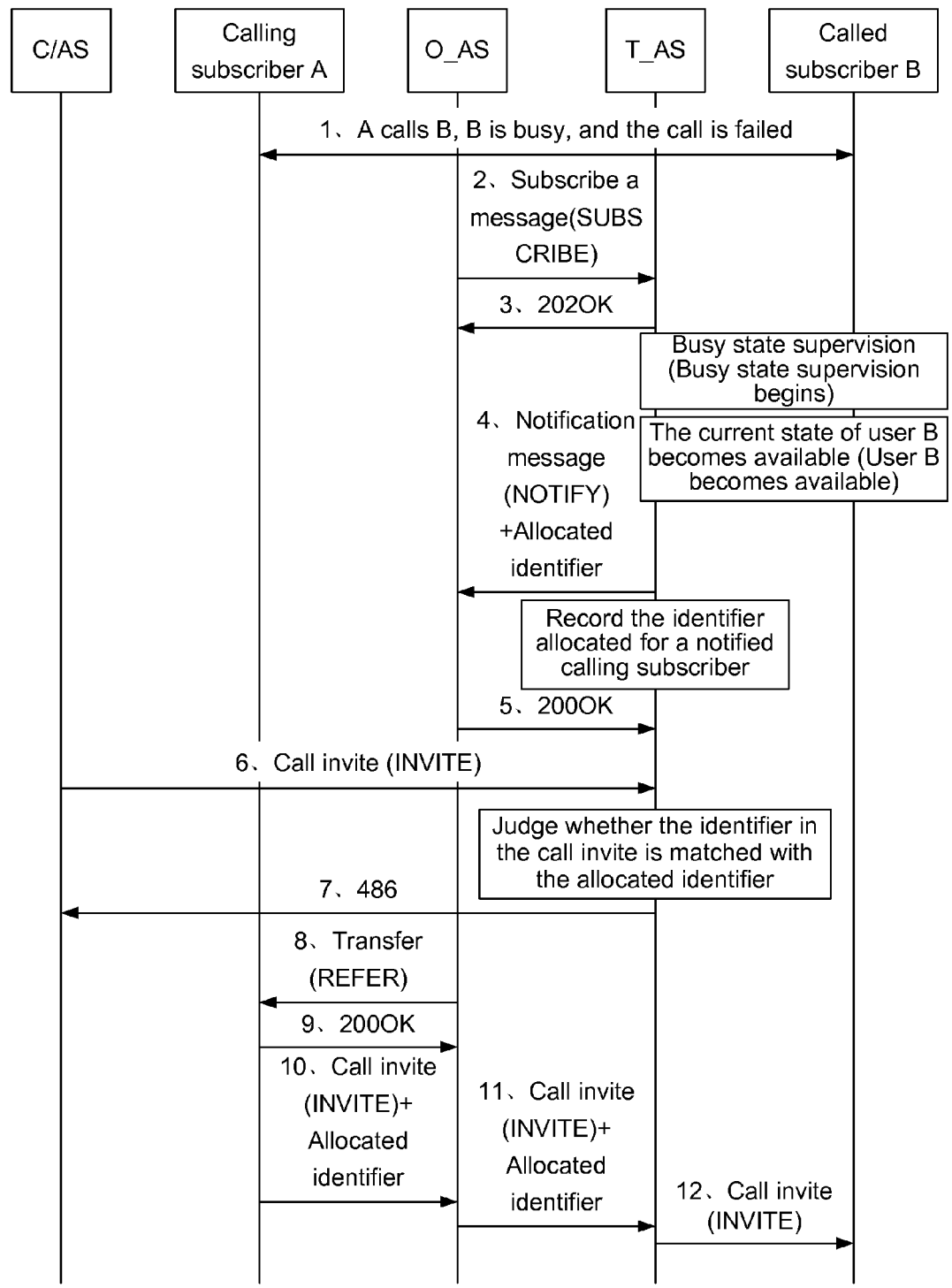
FIG. 6 is a flowchart illustrating a fourth embodiment of a method for accessing a CCBS service based on an identity in the disclosure.

FIG. 6 is a flowchart illustrating a fourth embodiment of a method for accessing a CCBS service based on an identity in the disclosure, as shown in FIG. 6, the method for accessing the CCBS service based on the identity in the embodiment comprises the following steps.

Step 1 to step 3 here are completely as same as that in FIG. 3, thereby needing no further description of the processing details;

Step 4: in the subscription process, when detecting that the called subscriber B is idle, the T_AS sends a notification message to the calling subscriber A; in the embodiment, when receiving the call invite of the calling subscriber and determining that the called subscriber B is busy, the T_AS allocates a corresponding identifier for the calling subscriber, such as an authentication serial number, and sends the identifier to the O_AS by the notify message in the step. The O_AS notifies or does not notify the calling subscriber A of the identifier;

the identifier allocated by the T_AS can also be inserted in the 202OK message in step 3 to achieve the aim of notifying the O_AS or the rejected calling subscriber;

Step 5: the O_AS sends a 200OK acknowledgement message to the T_AS;

Step 6: a malicious call subscriber C or an other AS sends a call invite to the T_AS, wherein the call invite does not include a corresponding identifier;

Step 7: the T_AS rejects the call invite, and directly sends a 486 reject message to a subscriber C or an AS to reject the call invite;

Step 8: the O_AS initiates a recall flow (Recall), taking the recall flow in an REFER mode as an example, the O_AS sends an REFER message to the calling subscriber A;

Step 9: the calling subscriber A sends a 200OK acknowledgement message to the O_AS;

Step 10: the calling subscriber A initiates a call invite which includes the identifier allocated by the T_AS; here, after receiving the notification message of the called subscriber or the 202OK message, the O_AS sends the calling subscriber A the identifier allocated by the T_AS to the calling subscriber A;

Step 11: the O_AS forwards the call invite of the calling subscriber A to the T_AS; and Step 12: the T_AS forwards the call invite to the called subscriber B. The T_AS authenticates the identifier in the received call invite, and if the authentication is passed, the T_AS forwards the call invite to the called subscriber B to make the calling subscriber A access to the called subscriber B.

In the embodiment, in step 10, the call invite initiated by the calling subscriber A may not include the identifier allocated by the T_AS to the calling subscriber A, and in step 11, after receiving the call invite from the calling subscriber A, the O_AS inserts the identity allocated by the T_AS to the calling subscriber A into the call invite. When not notifying the calling subscriber A of identifier, and after receiving a call invite from the calling subscriber A in step 11, the O_AS inserts the identity allocated by the T_AS to the calling subscriber A into the call invite.

Figure 7:
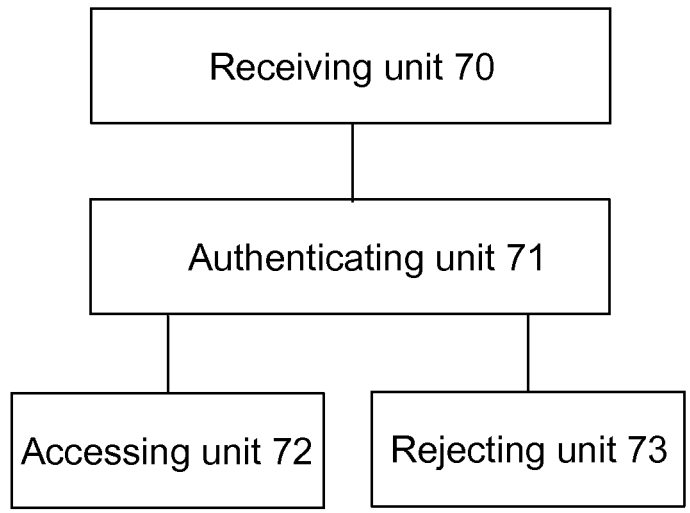
FIG. 7 is a schematic diagram illustrating a first composition and structure of a system for accessing a CCBS service based on an identity in the disclosure.

FIG. 7 is a schematic diagram illustrating a first composition structure of a system for accessing a CCBS service based on an identity in the disclosure, as shown in FIG. 7, the system comprises a receiving unit 70, an authenticating unit 71, an accessing unit 72 and a rejecting unit 73; wherein the receiving unit 70 is configured to receive a call invite and to trigger the authenticating unit 71 when determining that the call invite includes a call completion indicator;

the authenticating unit 71 is configured to authenticate the identity of a calling subscriber in the call invite, to trigger the accessing unit when the authentication is passed, and to trigger the rejecting unit when the authentication is failed;

the accessing unit 72 is configured to access the call from the calling subscriber; and the rejecting unit 73 is configured to reject access of the call from the calling subscriber.

The authenticating unit 71 can authenticate the identity of the calling subscriber based on a shared key. At this moment, the authenticating unit 71 comprises a determining sub-unit, a sending sub-unit, a re-sending sub-unit and an authenticating sub-unit; wherein the determining sub-unit is configured to determine whether the recall invite of the calling subscriber forwarded by the O_AS includes shared key information, to trigger the sending sub-unit when the shared key information is not included, and to trigger the authenticating sub-unit when the shared key information is included;

the sending sub-unit is configured to send a reject message to the O_AS, wherein the reject message includes a challenge value generated based on the shared key;

the resending sub-unit is configured to send a call invite including the shared key information to the T_AS; and the authenticating sub-unit is configured to authenticate the shared key information, wherein the identity of the calling subscriber becomes legal when the authentication is passed, and the identity of the calling subscriber becomes illegal when the authentication is failed.

Or, the authenticating unit 71 comprises a detecting sub-unit, a first sending sub-unit, a second sending sub-unit and an authenticating sub-unit; wherein the detecting subunit is configured to trigger the sending sub-unit when detecting that the called subscriber is idle;

the first sending sub-unit is configured to send a notification message to the O_AS, wherein the notification message includes a challenge value generated based on the shared key;

the second sending sub-unit is configured to send a recall invite including the shared key information to the T_AS; and the authenticating sub-unit is configured to authenticate the shared key information in the recall invite, wherein the identity of the calling subscriber becomes legal when the authentication is passed, and the identity of the calling subscriber becomes illegal when the authentication is failed.

Figure 8:
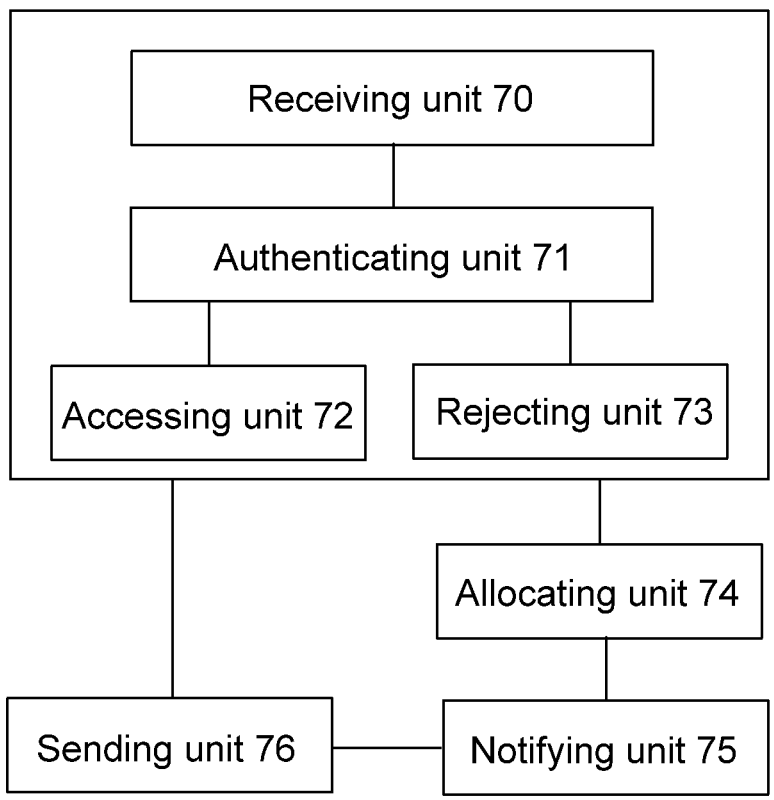
FIG. 8 is a schematic diagram illustrating a second composition and structure of a system for accessing a CCBS service based on an identity in the disclosure.

FIG. 8 is a schematic diagram illustrating a second composition structure of a system for accessing a CCBS service based on an identity in the disclosure; as shown in FIG. 8, based on the system in FIG. 7, the system for accessing the CCBS service based on the identity in the embodiment further comprises an allocating unit 74, a notifying unit 75 and a sending unit 76; wherein the allocating unit 74 is configured to allocate an identifier for the calling subscriber rejected for subscriber busy;

the notifying unit 75 is configured to notify the calling subscriber or the O-AS of the identifier;

the sending unit 76 is configured to send a recall invite including the identifier information to the T_AS; and the authenticating unit 71 authenticates the identifier information in the recall invite, and, when the authentication is passed, the identity of the calling subscriber becomes legal; and the identity of the calling subscriber becomes illegal when the authentication is failed.

Figure 9:
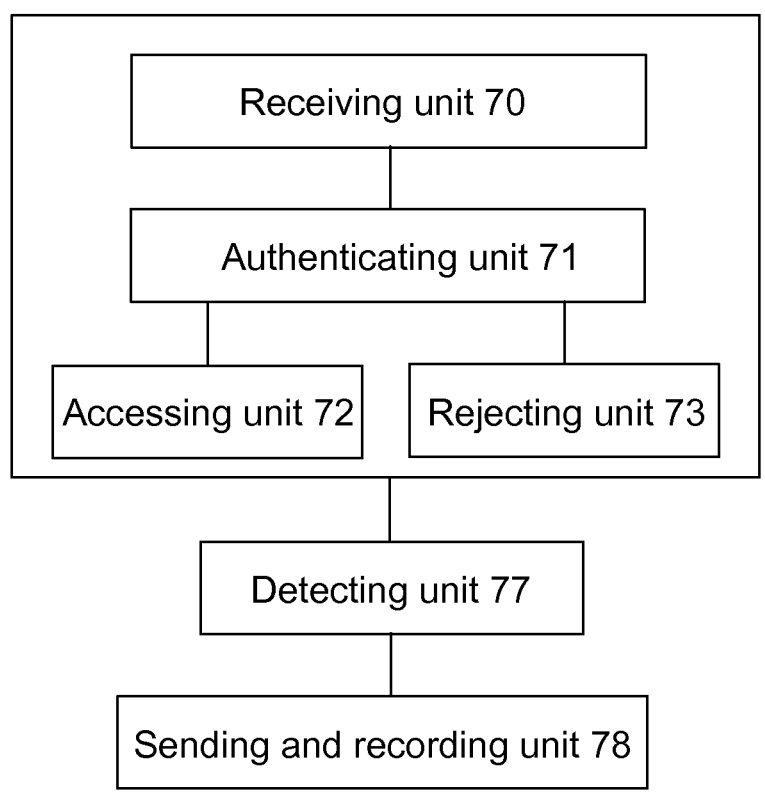
FIG. 9 is a schematic diagram illustrating a third composition and structure of a system for accessing a CCBS service based on an identity in the disclosure.

FIG. 9 is a schematic diagram illustrating a third composition structure of a system for accessing a CCBS service based on an identity in the disclosure; as shown in FIG. 9, based on the system shown in FIG. 7, the system for accessing the CCBS service based on the identity in the embodiment further comprises a detecting unit 77 and a sending and recording unit 78; wherein the detecting unit 77 is configured to trigger the sending and recording unit when detecting that the called subscriber is idle;

the sending and recording unit 78 is configured to send a notification message indicating that the called subscriber is idle to the calling subscriber, and to record the identifier information of the calling subscriber; and the authenticating unit 71 extracts the identifier information of the calling subscriber from the call invite forwarded by the O_AS, and compares the identifier information with identifier information of the calling subscriber recorded in the T_AS, wherein the identity authentication is passed when the identifier information of the calling subscriber from the call invite is identical to the identifier information of the calling subscriber recorded in the T_AS, and the identity authentication is failed when the identifier information of the calling subscriber from the call invite is not identical to the identifier information of the calling subscriber recorded in the T_AS.

It should be understood by those skilled in the art that, the systems for accessing a CCBS service based on an identity in FIG. 7 to FIG. 9 are designed for implementing the above-mentioned method for accessing a CCBS service based on an identity, and the functions of each processing unit of the systems shown in FIGS. 7, 8 and 9 can be understood with reference to the description of the above-mentioned method, realized by running programs on a processor and further realized by a specific logic circuit.

To sum up, the above are only preferred embodiments of the disclosure, and is not limited to the scope of protection of the disclosure herein.

What is claimed is:

1. A method for accessing a Completion of Call to Busy Subscriber (CCBS) service based on an identity, comprising:
    rejecting, by a callee, a call invite from a caller when the callee is busy;
    sending, by an Originating Application Server (O_AS), a subscribe message to a Terminating Application Server (T_AS) to subscribe the idle state of the callee;
    recording, by the T AS, an identity of the caller;
    sending, by the T_AS, a notification message indicating that the callee is idle to the caller when detecting that the callee is idle and wherein the notification message includes a shared key;
    authenticating, by the T_AS, the identity of the caller initiating a recall invite when receiving the recall invite and determining that the recall invite includes a call completion indicator;
    allowing, by the T_AS, the access of the caller when the identity authentication is passed; and
    rejecting, by the T_AS, the access of the caller when the identity authentication is failed;
    wherein authenticating, by the T_AS, the identity of the caller initiating the recall invite based on the shared key, specifically comprising:
    the T_AS determining whether the recall invite of the caller forwarded by the O_AS includes shared key information, and sending a reject message to the O_AS when the shared key information is not included in the recall invite forwarded by the O_AS, wherein the reject message sent by the T_AS includes a challenge value generated based on the shared key;
    the caller resending the recall invite, which includes the shared key information, to the T_AS ; and
    the T_AS authenticating the shared key information, wherein the identity of the caller becomes legal when the authentication is passed and the identity of the caller becomes illegal when the authentication is failed, wherein the authentication of the recall invite is passed when the shared key information of the caller from the recall invite is identical to the shared key information of the caller recorded in the T_AS, and the authentication of the recall invite is failed when the shared key information of the caller from the recall invite is not identical to the shared key information of the caller recorded in the T_AS;
    wherein the recall invite is the call invite once again from the caller to the callee when the state of callee is from busy to idle.

2. The method according to claim 1, wherein the T_AS authenticates the identity of the caller based on the shared key specifically by:

the T_AS, when detecting that the callee is idle, sending a notification message to the O_AS, wherein the notification message includes a challenge value generated based on the shared key;

the caller sending a recall invite including the shared key information to the T_AS; and the T_AS authenticating the shared key information in the recall invite, wherein the identity of the caller becomes legal when the authentication is passed and the identity of the caller becomes illegal when the authentication is failed.

3. The method according to claim 1, wherein the caller comprises a calling subscriber or a calling user equipment; and the callee comprises a called subscriber or a called user equipment.

4. The method according to claim 1, wherein the rejecting the access of the caller comprises:

rejecting the access of the caller by sending a reject message to the caller, wherein the reject message is a 486 message.

5. A system for accessing a CCBS service based on an identity, comprising a callee rejects a call invite from a caller when the callee is busy;

an Originating Application Server (O_AS) sends a subscribe message to a Terminating Application Server (T_AS) to subscribe the idle state of the callee;

the T_AS records an identity of the caller;

the T_AS sends a notification message indicating that the callee is idle to the caller when detecting that the callee is idle and wherein the notification messages includes a shared key;

the system further comprises a receiving unit, an authenticating unit, an accessing unit and a rejecting unit; wherein the receiving unit is configured to receive a recall invite and to trigger the authenticating unit when determining that the recall invite includes a call completion indicator;

the authenticating unit is configured to authenticate the identity of a caller in the recall invite, to trigger the accessing unit when the authentication is passed and to trigger the rejecting unit when the authentication is failed;

the accessing unit is configured to access the recall invite from the caller; and the rejecting unit is configured to reject access of the recall invite from the caller;

wherein the authenticating unit authenticates the identity of the caller based on the shared key; and the authenticating unit further comprises a determining sub-unit, a sending sub-unit, a re-sending sub-unit and an authenticating sub-unit; wherein the determining sub-unit is configured to determine whether the recall invite of the caller forwarded by the O_AS includes shared key information, to trigger the sending sub-unit when the shared key information is not included in the call invite forwarded by the O_AS, and to trigger the authenticating sub-unit when the shared key information is included;

the sending sub-unit is configured to send a reject message including a challenge value generated based on the shared key to the O_AS;

the resending sub-unit is configured to send the recall invite including the shared key information to the T_AS; and the authenticating sub-unit is configured to authenticate the shared key information, wherein the identity of the caller becomes legal when the authentication is passed and the identity of the caller becomes illegal when the authentication is failed; wherein the authentication of the recall invite is passed when the shared key information of the caller from the recall invite is identical to the shared key information of the caller recorded in the T_AS, and the authentication of the recall invite is failed when the shared key information of the caller from the recall invite is not identical to the shared key information of the caller recorded in the T_AS;

wherein the recall invite is the call invite once again from the caller to the callee when the state of callee is from busy to idle.

6. The system according to claim 5, wherein the authenticating unit further comprises a detecting sub-unit, a first sending sub-unit, a second sending sub-unit and an authenticating sub-unit; wherein the detecting sub-unit is configured to trigger the sending sub-unit when detecting that the callee is idle;

the first sending sub-unit is configured to send a notification message including a challenge value generated based on the shared key to the O_AS;

the second sending sub-unit is configured to send a recall invite including the shared key information to the T_AS; and the authenticating sub-unit is configured to authenticate the shared key information in the recall invite, wherein the identity of the caller becomes legal when the authentication is passed and the identity of the caller becomes illegal when the authentication is failed.

* * * * *